(12) United States Patent
Hama et al.

(10) Patent No.: US 7,807,760 B2
(45) Date of Patent: Oct. 5, 2010

(54) PROCESS FOR PRODUCING ETHYLENE-α-OLEFIN COPOLYMER

(75) Inventors: Hisakatsu Hama, Ichihara (JP); Jun Kawashima, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/021,542

(22) Filed: Jan. 29, 2008

(65) Prior Publication Data

US 2008/0214746 A1 Sep. 4, 2008

(30) Foreign Application Priority Data

Jan. 31, 2007 (JP) .............................. 2007-021179

(51) Int. Cl.
*C08F 2/00* (2006.01)
*C08F 210/00* (2006.01)
*B01J 10/00* (2006.01)

(52) U.S. Cl. ........................... 526/65; 526/89; 526/348; 422/129

(58) Field of Classification Search .................. 422/129; 526/65, 89, 348
See application file for complete search history.

(56) References Cited

U.S. PATENT DOCUMENTS

2007/0100103 A1* 5/2007 Lim et al. .................. 526/335

FOREIGN PATENT DOCUMENTS

| JP | 55-36251 A | 3/1980 |
|---|---|---|
| JP | 2002-505357 A | 2/2002 |

\* cited by examiner

*Primary Examiner*—William K Cheung
(74) *Attorney, Agent, or Firm*—Sughrue Mion, PLLC

(57) ABSTRACT

Disclosed is a process for producing an ethylene-α-olefin copolymer excellent in balancing between strength and elongation by continuous multi-step polymerization. The process comprises continuously polymerizing ethylene and α-olefin in a solvent in the presence of an olefin polymerization catalyst using a polymerization reaction apparatus comprising two or more tanks of polymerization reactors connected in series, said process including a first polymerization step of producing in one tank of polymerization reactor a polymer component under the polymerization condition of a flow state being 1.5 or more tanks in the perfect mixing cell model, and a second polymerization step of producing in one tank of polymerization reactor a polymer component under specific polymerization conditions.

1 Claim, 1 Drawing Sheet

PROCESS FOR PRODUCING ETHYLENE-α-OLEFIN COPOLYMER

BACKGROUND OF THE INVENTION

The present invention relates to a process for producing an ethylene-α-olefin copolymer.

Ethylene-α-olefin copolymers such as ethylene-α-olefin-conjugated diene copolymers are widely used as materials for automobiles, industrial apparatuses, office appliances, construction materials, etc. As a process for producing the ethylene-α-olefin copolymer, there is known a process which comprises preparing two kinds of ethylene-α-olefin copolymers and melt mixing them for obtaining polymers having desired physical properties depending on the use.

As other process, there is known a process for producing an ethylene-α-olefin copolymer by continuous multistage polymerization using a multistage polymerization reaction apparatus comprising two or more tanks of polymerization reactors connected in series. For example, Patent Document 1 discloses that using a multistage polymerization reaction apparatus comprising two connected polymerization reactors of the same volume, ethylene, propylene and dicyclopentadiene are copolymerized at multistage with a first polymerization reactor and a second polymerization reactor under the same conditions, except for changing the amounts of hydrogen gas and comonomers fed to the first polymerization reactor and the second polymerization reactor. Patent Document 2 shown below discloses that using a multistage polymerization reaction apparatus comprising two connected polymerization reactors of the same volume, ethylene and propylene are copolymerized at multistage with a first polymerization reactor and a second polymerization reactor under the same conditions, except for changing the amounts of hydrogen gas and comonomers and the polymerization temperature between the first polymerization reactor and the second polymerization reactor, and further discloses that the process carried out by the continuous multistage polymerization is economically advantageous.

Patent Document 1: JP-A-55-36251
Patent Document 2: JP-A-2002-505357

SUMMARY OF THE INVENTION

However, the ethylene-α-olefin copolymer obtained by the conventional continuous multistage polymerization is not satisfactory in balance of strength and elongation of the resulting ethylene-α-olefin copolymer because the product is sometimes low in strength or elongation.

Under the circumstances, the object of the present invention is to provide a process for producing an ethylene-α-olefin copolymer by continuous multistage polymerization according to which an ethylene-α-olefin copolymer excellent in balance between strength and elongation is obtained.

The present invention relates to a process for producing an ethylene-α-olefin copolymer which comprises continuously polymerizing ethylene and α-olefin in a solvent in the presence of an olefin polymerization catalyst using a polymerization reaction apparatus comprising two or more tanks of polymerization reactors connected in series, said process including the following first and second polymerization steps:

the first polymerization step of producing in one tank of polymerization reactor a polymer component having a Mooney viscosity at 100° C. of 10-300 and containing 45-80% by weight of a monomer unit based on ethylene (with a proviso that total content of the monomer unit based on ethylene and the monomer unit based on α-olefin is assumed to be 100% by weight) under the polymerization conditions of a polymerization temperature of −20 to 200° C., a polymerization pressure of 0.1-10 MPa, and a flow state being 1.5 or more tanks in the perfect mixing cell model, and the second polymerization step of producing in one tank of polymerization reactor a polymer component having a Mooney viscosity at 100° C. of 10-300 and containing 45-80% by weight of a monomer unit based on ethylene (with a proviso that total content of the monomer unit based on ethylene and the monomer unit based on α-olefin is assumed to be 100% by weight) under the polymerization conditions of a polymerization temperature of −20 to 200° C., a polymerization pressure of 0.1-10 MPa, a flow state being less than 1.5 tanks in the perfect mixing cell model, and a ratio (n1/n2) of 1.5 or more in which n1 denotes the number of tanks in the perfect mixing cell model at the first polymerization step and n2 denotes the number of tanks in the perfect mixing cell model at the second polymerization step.

The present invention can provide a process for producing an ethylene-α-olefin copolymer by continuous multistage polymerization which can give an ethylene-α-olefin copolymer excellent in balance between strength and elongation.

DESCRIPTION OF THE PREFERRED EMBODIMENTS

Figure 1:
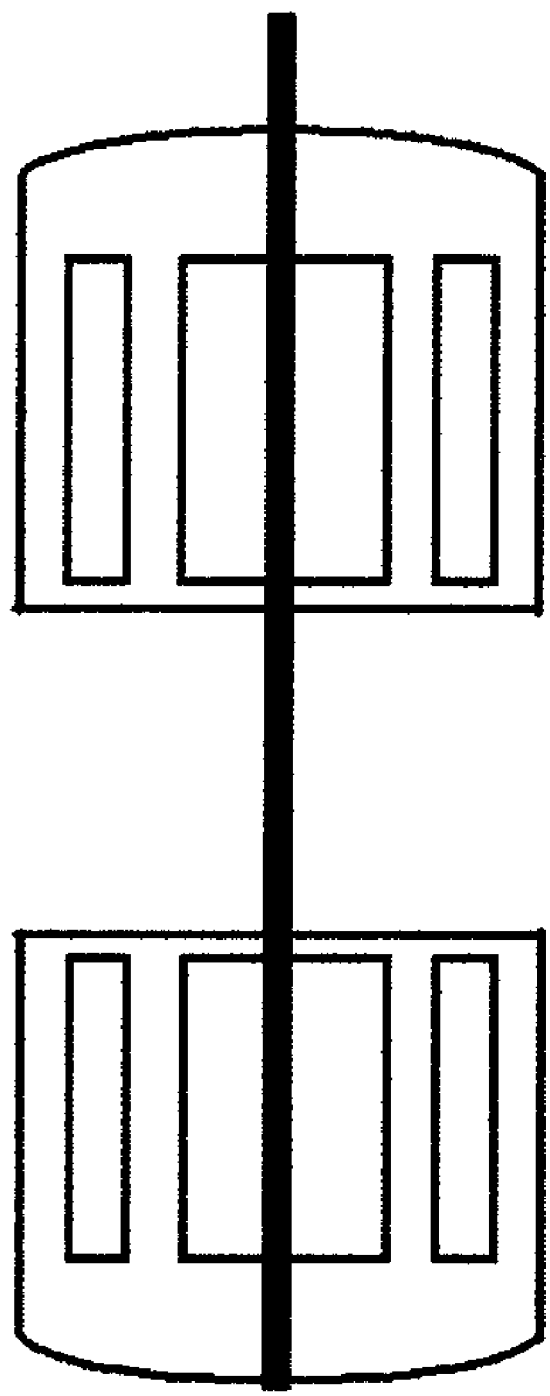
FIG. 1 is a schematic view of stirring blades used in the first and second polymerization reactors in Example 1 of the present invention.

In the present invention, ethylene and α-olefin are continuously polymerized in a solvent in the presence of an olefin polymerization catalyst using a polymerization reaction apparatus comprising two or more polymerization reactors connected in series.

As the olefin polymerization catalyst, there may be used catalysts obtained by subjecting a transition metal compound and an activation co-catalyst to a contact treatment, and examples of the catalysts are those which are obtained by using a vanadium compound as a transition metal compound and an organoaluminum compound as an activation co-catalyst, a transition metal compound having a ligand having a cyclopentadiene type anion skeleton as a transition metal compound and an organoaluminumoxy compound, a boron compound, an organoaluminum compound or the like as an activation co-catalyst.

As the vanadium compound, mention may be made of a compound represented by the formula VO(OR)$_n$X$_{3-n}$ (wherein R represents a hydrocarbon group, X represents a halogen atom, and n is a numeral of 0-3), and more specific examples are VOCl$_3$, VO(OCH$_3$)Cl$_2$, VO(OCH$_3$)$_2$Cl, VO(OCH$_3$)$_3$, VO(OC$_2$H$_5$)Cl$_2$, VO(OC$_2$H$_5$)$_2$Cl, VO(OC$_2$H$_5$)$_3$, VO(OC$_3$H$_7$)Cl$_2$, VO(OC$_3$H$_7$)$_2$Cl, VO(OC$_3$H$_7$)$_3$ or mixtures thereof.

As the transition metal compounds having a ligand having a cyclopentadiene type anion skeleton, mention may be made of metallocene compounds represented by the formula R$^1{}_k$R$^2{}_l$R$^3{}_m$R$^4{}_n$M (wherein M$^1$ represents a transition metal belonging to Group 4 of the periodic table of elements (such as zirconium, titanium or hafnium), R$^1$ represents a ligand having a cyclopentadiene type anion skeleton, R$^2$, R$^3$ and R$^4$ each represent a ligand having a cyclopentadiene type anion skeleton, an alkyl group, a cycloalkyl group, an aryl group, an aralkyl group, an alkoxy group, an aryloxy group, a halogen atom or a hydrogen atom, and k and l each represent an integer of 1 or more, and k+l+m+n=4). Examples of the metallocene compounds are bis(cyclopentadienyl)diethyltitanium, bis (cyclopentadienyl)dimethyltitanium, bis(pentamethylcyclopentadienyl)dimethyltitanium, bis(cyclopentadienyl)dichlorotitanium, bis(cyclopentadienyl)titanium monochloride monohydride, bis(indenyl)titanium monochloride monohydride, bis(indenyl)titanium dichloride, ethylenebis(indenyl) dimethyltitanium, ethylenebis(indenyl)methyltitanium chloride, ethylenebis(indenyl)titanium dichloride, ethylenebis(4, 5,6,7-tetrahydro-1-indenyl)titanium dichloride, ethylenebis (4,5,6,7-tetrahydro-1-indenyl)dimethyltitanium, ethylenebis (4-methyl-1-indenyl)titanium dichloride, ethylenebis(2,3-dimethyl-1-indenyl)titanium dichloride, bis (cyclopentadienyl)diethyltitanium, bis(cyclopentadienyl) dimethylzirconium, bis(pentamethylcyclopentadienyl) dimethylzirconium, bis(cyclopentadienyl) dichlorozirconium, bis(cyclopentadienyl)zirconium monochloride monohydride, bis(indenyl)zirconium monochloride monohydride, bis(indenyl)zirconium dichloride, ethylenebis(indenyl)dimethylzirconium, ethylenebis (indenyl)methylzirconium dichloride, ethylenebis(indenyl) zirconium dichloride, ethylenebis(4,5,6,7-tetrahydro-1-indenyl)zirconium dichloride, ethylenebis(4,5,6,7-tetrahydro-1-indenyl)dimethylzirconium, ethylenebis(4-methyl-1-indenyl)zirconium dichloride, ethylenebis(2,3-dimethyl-1-indenyl)zirconium dichloride, etc.

Examples of the organoaluminum compounds are trimethylaluminum, triethylaluminum, tri-n-butylaluminum, triisobutylaluminum, tri-n-hexylaluminum, diisobutylhexylaluminum, diisobutyloctylaluminum, isobutyldihexylaluminum, isobutyldioctylaluminum, etc.

Examples of the organoaluminumoxy compounds are tetramethyldialuminoxane, tetraethyldialuminoxane, tetrabutyldialuminoxane, tetrahexyldialuminoxane, methylaluminoxane, ethylaluminoxane, butylaluminoxane, hexylaluminoxane, etc.

Examples of the boron compounds are tris(pentafluorophenyl)borane, triphenylcarbeniumtetrakis(pentafluorophenyl)borate, tri(n-butyl)ammoniumtetrakis(pentafluorophenyl)borate, N,N-dimethylaniliniumtetrakis (pentafluorophenyl)borate, etc.

In the contact treatment of transition metal compound and organoaluminum compound, the amount of the organoaluminum compound to be subjected to the contact treatment is usually 0.1-10000 mols, preferably 5-2000 mols, more preferably 10-1000 mols in terms of aluminum atom of the organoaluminum compound per 1 mol of transition metal atom. In the contact treatment of transition metal compound and organoaluminumoxy compound, the amount of the organoaluminumoxy compound to be subjected to the contact treatment is usually 0.1-10000 mols, preferably 5-2000 mols, more preferably 10-1000 mols in terms of aluminum atom of the organoaluminumoxy compound per 1 mol of transition metal atom. In the contact treatment of transition metal compound and boron compound, the amount of the boron compound to be subjected to the contact treatment is usually 0.01-100 mols, preferably 0.1-50 mols, more preferably 0.5-20 mols in terms of boron atom of the boron compound per 1 mol of transition metal atom.

Examples of the α-olefins are straight chain olefins such as propylene, 1-butene, 1-pentene, 1-hexene, 1-heptene, 1-octene, 1-nonene and 1-decene; and branched chain olefins such as 3-methyl-1-butene, 3-methyl-1-pentene and 4-methyl-1-pentene. One or more α-olefins are used, and α-olefins of 3-20 carbon atoms are preferred, and propylene and 1-butene are more preferred, and propylene is particularly preferred.

In the present invention, in addition to ethylene and α-olefin, other copolymerizable olefinic monomers may be used for carrying out the copolymerization. The olefinic monomers include polyenes, vinyl aromatic compounds, vinyl alicyclic compounds, cyclic olefins, etc.

Examples of the polyenes are 1,4-hexadiene, 1,5-hexadiene, 1,5-heptadiene, 1,6-heptadiene, 1,6-octadiene, 1,7-octadiene, 1,7-nonadiene, 1,8-nonadiene, 1,8-decadiene, 1,9-decadiene, 1,12-tetradecadiene, 1,13-tetradecadiene, 3-methyl-1,4-hexadiene, 3-methyl-1,5-hexadiene, 3-ethyl-1,4-hexadiene, 3-ethyl-1,5-hexadiene, 3,3-dimethyl-1,4-hexadiene, 3,3-dimethyl-1,5-hexadiene, dicyclopentadiene, 5-ethylidene-2-norbornene, 5-vinyl-2-norbornene, 2,5-norbornadiene, 7-methyl-2,5-norbornadiene, 7-ethyl-2,5-norbornadiene, 7-propyl-2,5-norbornadiene, 7-butyl-2,5-norbornadiene, 7-pentyl-2,5-norbornadiene, 7-hexyl-2,5-norbornadiene, 7,7-dimethyl-2,5-norbornadiene, 7,7-methylethyl-2,5-norbornadiene, 7-chloro-2,5-norbornadiene, 7-bromo-2,5-norbornadiene, 7-fluoro-2,5-norbornadiene, 7,7-dichloro-2,5-norbornadiene, 1-methyl-2,5-norbornadiene, 1-ethyl-2,5-norbornadiene, 1-propyl-2,5-norbornadiene, 1-butyl-2,5-norbornadiene, 1-chloro-2,5-norbornadiene, 1-bromo-2,5-norbornadiene, etc.

Further examples of the polyenes are the compounds having the following structures.

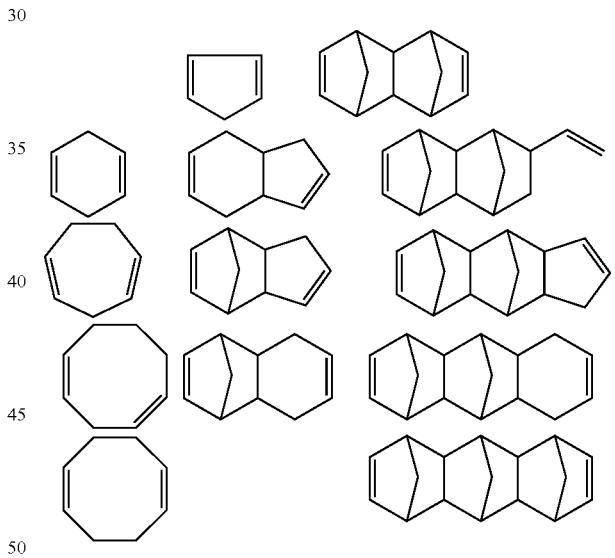

One or more of the polyenes are used, and preferred are 5-ethylidene-2-norbornene, dicyclopentadiene, 5-vinylnorbornene, and norbornadiene.

Examples of the vinyl aromatic compounds are styrene, o-methylstyrene, m-methylstyrene, p-methylstyrene, etc. Examples of the vinyl alicyclic compounds are vinylcyclohexane, vinylcycloheptane, vinylcyclooctane, etc. Examples of the cyclic olefins are cyclohexene, 2-norbornene, etc.

As the solvents, there may be used inert solvents, for example, aliphatic hydrocarbons such as propane, butane, isobutane, pentane, hexane, heptane, octane, decane and dodecane; alicyclic hydrocarbons such as cyclopentane and cyclohexane; and the like.

As the polymerization reaction apparatus, there may be used a continuous multistage polymerization reaction apparatus comprising two tanks of polymerization reactors connected in series in which the reaction mixture obtained by polymerization in the first tank of polymerization reactors is then continuously fed to the second tank of polymerization reactors whereby polymerization of ethylene and α-olefin, and, if necessary, other copolymerizable olefinic monomers can be performed. Usually, the first polymerization step is carried out in the first tank and the second polymerization is carried out in the second tank. The number of the polymerization tanks connected in series in the polymerization reaction apparatus is usually 3 or less, preferably 2.

At the first polymerization step, a solvent, a polymerization catalyst and monomers (ethylene, α-olefin, and, if necessary, other copolymerizable olefinic monomers) are fed to the polymerization reactor, and ethylene, α-olefin, and, if necessary, other copolymerizable olefinic monomers are continuously polymerized in the solvent to produce a polymer component (X) having a monomer unit based on ethylene and a monomer unit based on α-olefin. As for the polymerization catalyst, a transition metal compound and an activation co-catalyst may be separately fed to the polymerization reactor and may be subjected to contact treatment in the polymerization reactor, and the respective monomers may be fed separately or may be previously mixed and then fed to the polymerization reactor.

The polymerization temperature (T1) in the first tank of polymerization reactor is −20-200° C., preferably 0-150° C., more preferably 20-120° C.

The polymerization pressure (P1) in the first tank of polymerization reactor is 0.1-10 MPa, preferably 0.1-5 MPa, more preferably 0.1-3 MPa.

The flow state in the first tank of polymerization reactor is 1.5 or more tanks in the perfect mixing cell model. The number of tanks (n1) in the perfect mixing cell model connected in series is preferably 1.8 or more, more preferably 2 or more. The number of tanks (n1) is usually 5 or less.

The number of tanks (n1) in the perfect mixing cell model can be adjusted by changing the shape of stirring blade, providing a partition plate in the polymerization reactor, changing the position or shape of the partition plate, and the like, and increase of the number of tanks (n1) can be attained, for example, by using multistage blades or providing the partition plate having a face perpendicular to the flow direction of the polymerization solution.

The number of tanks (n1) in the perfect mixing cell model in the first polymerization reactor can be obtained by known methods such as step response method and impulse response method.

A molecular weight modifier such as hydrogen may be used for controlling the molecular weight of the polymer component (X) at the first polymerization step.

The concentration of the polymer component in the reaction mixture in the first tank of polymerization reactor is usually 3-25% by weight, preferably 7-20% by weight, more preferably 10-15% by weight.

The Mooney viscosity (ML1) of the polymer component (X) produced at the first polymerization step is 10-300 ($ML_{1+4}$, 100° C.), preferably 30-250, more preferably 30-200. The Mooney viscosity is measured at 100° C. in accordance with JIS K6395 (1997).

The content (E1) of the monomer unit based on ethylene in the polymer component (X) produced at the first polymerization step is 45-80% by weight, preferably 50-75% by weight, more preferably 50-65% by weight, with a proviso that the total content of the monomer unit based on ethylene and the monomer unit based on α-olefin in the polymer component (X) is assumed to be 100% by weight. The content can be obtained by infrared spectroscopic method.

The total content of the monomer unit based on ethylene and the monomer unit based on α-olefin in the polymer component (X) produced at the first polymerization step is preferably not less than 85% by weight, more preferably not less than 88% by weight, further preferably not less than 90% by weight, with a proviso that the total content of the monomer units in the polymer component (X) is assumed to be 100% by weight. The content can be obtained by infrared spectroscopic method.

At the second polymerization step, the reaction mixture obtained by polymerization in the polymerization reactor at the first polymerization step, and, if necessary, a solvent, a polymerization catalyst and monomers (ethylene, α-olefin, and, if necessary, other copolymerizable olefinic monomers) are continuously fed to the polymerization reactor of the second polymerization step, and ethylene, α-olefin, and, if necessary, other copolymerizable olefinic monomers are continuously polymerized in the solvent to produce a polymer component (Y) having a monomer unit based on ethylene and a monomer unit based on α-olefin. As for the polymerization catalyst, a transition metal compound and an activation co-catalyst may be separately fed to the polymerization reactor and may be subjected to contact treatment in the polymerization reactor, and the respective monomers may be fed separately or may be previously mixed and then fed to the polymerization reactor.

The polymerization temperature (T2) in the second tank is −20-200° C., preferably 0-150° C., more preferably 20-120° C.

The polymerization pressure (P2) in the second tank is 0.1-10 MPa, preferably 0.1-5 MPa, more preferably 0.1-3 MPa.

The flow state of in the second tank of polymerization reactor is less than 1.5 tank in the perfect mixing cell model. The number of tanks (n2) in the perfect mixing cell model of series connection is preferably 1.2 or less. The number of tanks (n2) is usually 0.5 or more.

The number of tanks (n2) in the perfect mixing cell model can be adjusted by changing the shape of stirring blade, providing a partition plate in the polymerization reactor, changing the position or shape of the partition plate, and the like, and decrease of the number of tanks (n2) can be attained, for example, by using one blade or providing a partition plate having a face parallel to the flow direction of the polymerization solution.

The ratio (n1/n2) of the number of tanks (n1) in the perfect mixing cell model of series connection at the first polymerization step and the number of tanks (n2) in the perfect mixing cell model in series connection at the second polymerization step is 1.5 or more, preferably 1.8 or more. The ratio (n1/n2) is usually 10 or less, preferably 5 or less.

The number of tanks (n2) in the perfect mixing cell model in the second polymerization reactor can be obtained by known methods such as step response method and impulse response method as in the case of obtaining the number of the first tank (n1).

A molecular weight modifier such as hydrogen may be used for controlling the molecular weight of the polymer component (Y) at the second polymerization step.

The concentration of the polymer component in the reaction mixture in the second tank of polymerization reactor is usually 3-25% by weight, preferably 7-20% by weight, more preferably 10-15% by weight.

The Mooney viscosity (ML2) of the polymer component (Y) produced at the second polymerization step is 10-300 ($ML_{1+4}$, 100° C.), preferably 30-250, more preferably 30-200. The Mooney viscosity is measured at 100° C. in accordance with JIS K6395 (1997).

The content (E2) of the monomer unit based on ethylene in the polymer component (Y) produced at the second polymerization step is 45-80% by weight, preferably 50-75% by weight, more preferably 50-65% by weight, with a proviso that the total content of the monomer unit based on ethylene and the monomer unit based on α-olefin in the polymer component (Y) is assumed to be 100% by weight. The content can be obtained by infrared spectroscopic method.

The total content of the monomer unit based on ethylene and the monomer unit based on α-olefin in the polymer component (Y) produced at the second polymerization step is preferably not less than 85% by weight, more preferably not less than 88% by weight, further preferably not less than 90% by weight, with a proviso that the total content of the monomer units in the polymer component (Y) is assumed to be 100% by weight. The content can be obtained by infrared spectroscopic method.

The weight ratio of the polymer component (X) produced at the first polymerization step and the polymer component (Y) produced at the second polymerization step is preferably 5/1-0.5/1, more preferably 3/1-1/1.

An ethylene-α-olefin copolymer can be taken out from the reaction mixture drawn from the polymerization reactor at the final polymerization step by known desolvation treatment, drying treatment, etc.

The Mooney viscosity of the ethylene-α-olefin copolymer is 10-300, preferably 30-250, more preferably 30-200. The Mooney viscosity is measured at 100° C. in accordance with JIS K6395 (1997).

The molecular weight distribution (Mw/Mn) of the ethylene-α-olefin copolymer is preferably 2-6. The molecular weight distribution (Mw/Mn) is measured by gel permeation chromatography (GPC).

The content of the monomer unit based on ethylene in the ethylene-α-olefin copolymer is usually 45-80% by weight, preferably 50-75% by weight, with a proviso that the total content of the monomer unit based on ethylene and the monomer unit based on α-olefin in the ethylene-α-olefin copolymer is assumed to be 100% by weight. The content can be obtained by infrared spectroscopic method.

The total content of the monomer unit based on ethylene and the monomer unit based on α-olefin in the ethylene-α-olefin copolymer is preferably not less than 85% by weight, more preferably not less than 88% by weight, further preferably not less than 90% by weight, with a proviso that the total content of the monomer units in the ethylene-α-olefin copolymer is assumed to be 100% by weight. The content can be obtained by infrared spectroscopic method.

The ethylene-α-olefin copolymer obtained by the present invention can be widely and suitably used for automobile materials such as various weatherstrips, hoses and rubber vibration insulators, construction materials such as glass packing, various industrial materials, wire coating materials, low-temperature impact characteristic improvers for polypropylene resins, thermoplastic elastomer raw materials, viscosity index improvers of oils, etc.

EXAMPLES

The present invention will be explained below using examples and comparative examples.

The evaluation of physical properties of the polymer was conducted by the following methods.

1. Mooney Viscosity ($ML_{1+4}$):

This was measured at 100° C. in accordance with JIS K6395 (1997).

2. Amount of Ethylene Unit and Amount of Propylene Unit:

Content of monomer unit based on ethylene (amount of ethylene unit) and content of monomer unit based on propylene (amount of propylene unit) were measured by infrared spectroscopic method. The amount of ethylene unit and the amount of propylene unit were obtained assuming that the total amount of the amount of ethylene unit and the amount of propylene unit to be 100% by weight. A film of about 0.1 mm in thickness was used as a sample, and absorption peak at 1155 $cm^{-1}$ originating from the methyl branch and absorption peak at 721 $cm^{-1}$ originating from the methylene group were measured in accordance with literature value ("Characterization of Polyethylene by Infrared Absorption Spectrum" by Takayama, Usami and others, or "Die Makromolekulare Chemie", 177, 461 (1976) by Mc Rae, M. A., MadamS, W. F. and others) by an infrared spectrophotometer (IR-810 manufactured by JASCO Corporation). Ethylene homopolymer, propylene homopolymer and ethylene-propylene copolymer (amount of ethylene unit: 50 wt %, amount of propylene unit: 50 wt %) were used as standard samples.

3. Iodine Value:

A polymer was molded into a film of about 0.5 mm in thickness by a pressing machine, and a peak of the film originating from 5-ethylidene-2-norbornene (absorption peak of 1688 $cm^{-1}$) was measured by the infrared spectrophotometer, and molar content of double bond in the polymer was obtained. The iodine value was calculated from the molar content.

4. Breaking Elongation and Breaking Strength:

The polymer was molded into a sheet of 2 mm in thickness using a pressing machine regulated in temperature to 150° C. and a mold for molding a sheet of 2 mm in thickness, and a test piece was punched out from the sheet using a No. 3 dumbbell described in JIS K6251 (1993). The test piece was subjected to a tensile test under the conditions of a temperature of 23° C. and a pulling rate of 500 mm/min to obtain a breaking elongation and a breaking strength.

Example 1

Polymerization

Ethylene, propylene and 5-ethylidene-2-norbornene were continuously copolymerized using a polymerization reaction apparatus comprising two 100 L polymerization reactors made of SUS which were connected in series. In the first polymerization reactor, two tilted paddle blades were provided at the upper and lower stages, and the rotation direction was set so that an upward flow of liquid was produced by the tilted paddle blades (namely, the liquid was paddled up). The stirring blades shown in FIG. 1 were provided in the second polymerization reactor. Hexane as a polymerization solvent was continuously fed at a rate of 87.4 kg/hr, ethylene, propylene and 5-ethylidene-2-norbornene as monomers were continuously fed at a rate of 5.05 kg/hr, 21.20 kg/hr and 0.73 kg/hr, respectively, and oxytriisopropoxyvanadium and ethylaluminumsesquichloride as catalysts were continuously fed at a rate of 0.00494 kg/hr and 0.0282 kg/hr, respectively, into the first polymerization reactor from the bottom thereof. On the other hand, from the top of the first polymerization reactor was continuously drawn the reaction mixture so that the amount of the reaction mixture in the first polymerization reactor was 100 L. Regulation of molecular weight was carried out with hydrogen. The feeding rate of hydrogen was 15 NL/hr. While the reaction mixture drawn from the top of the first polymerization reactor was fed into the second polymerization reactor from the bottom thereof, hexane as a polymerization solvent was continuously fed at a rate of 33 kg/hr, ethylene and 5-ethylidene-2-norbornene as monomers were continuously fed at a rate of 1.25 kg/hr and 0.315 kg/hr, respectively, and oxytriisopropoxyvanadium and ethylaluminumsesquichloride as catalysts were continuously fed at a rate of 0.0247 kg/hr and 0.0141 kg/hr, respectively, into the second polymerization reactor from the bottom thereof. The reaction mixture was continuously drawn from the top of the second polymerization reactor so that the amount of the reaction mixture in the second polymerization reactor was 100 L. The temperatures of both the first polymerization reactor and the second polymerization reactor were controlled to 50° C.

A small amount of polypropylene glycol was added to the reaction mixture drawn from the second polymerization reactor to terminate the polymerization reaction. After removing the monomers and washing with water, the solvent was removed with steam in a large amount of water, followed by drying at 80° C. under reduced pressure to obtain ethylene-propylene-5-ethylidene-2-norbornene copolymer.

(Physical Properties of Polymer)

The resulting ethylene-propylene-5-ethylidene-2-norbornene copolymer had a Mooney viscosity of 61, an amount of propylene unit/(amount of ethylene unit+amount of propylene unit) of 31.7% by weight, an iodine value of 17, a breaking elongation of 2625%, and a breaking strength of 1.36 MPa.

(Measurement of the Number of Tanks in the Perfect Mixing Cell Model)

Using the first polymerization reactor in the state of being filled with liquid, ethylene, propylene and 5-ethylidene-2-norbornene were continuously copolymerized, and after the conditions were sufficiently stabilized, 5-ethylidene-2-norbornene was replaced with dicyclopentadiene. The reaction mixture discharged from the polymerization reactor at this time was collected at intervals of a given time, and the change in concentrations of the remaining 5-ethylidene-2-norbornene and dicyclopentadiene was examined. The feeding conditions from the bottom of the polymerization reactor in this case were feeding of hexane as a polymerization solvent at a rate of 78.8 kg/hr, ethylene, propylene and 5-ethylidene-2-norbornene as monomers at a rate of 3.33 kg/hr, 17.15 kg/hr and 0.703 kg/hr, respectively, and oxyvanadium trichloride and ethylaluminumsesquichloride as catalysts at a rate of 0.00337 kg/hr and 0.01886 kg/hr, respectively. With keeping the conditions, 5-ethylidene-2-norbornene was replaced with dicyclopentadiene, and the reaction mixture was taken from the discharge opening at the points of time of 5, 10, 15, 20, 25, 30, 35, 40, 60, 80, 100 and 120 minutes after the replacement with dicyclopentadiene (0 minute). Change in concentrations of unreacted 5-ethylidene-2-norbornene and dicyclopentadiene was examined by a gas chromatograph, and the diene component polymerized in the polymer was examined by proton NMR. The concentration of unreacted diene monomer in the solution at the time of sampling and that of the diene component polymerized in the polymer were totaled, and the concentration and the time were plotted to obtain a response curve of diene concentration at the outlet. When analyzed using this response curve by step response method, the number of tanks in the perfect mixing cell model was 2.0.

Continuous polymerization was carried out using the second polymerization reactor in the same manner as carried out in the first polymerization reactor, and a response curve of diene concentration at the outlet of the second polymerization reactor. When analyzed using this response curve by step response method, the number of tanks in the perfect mixing cell model was 1.1.

Comparative Example 1

Polymerization was carried out under the same conditions as in Example 1, except that the stirring blade of the first polymerization reactor in Example 1 was used in the second polymerization reactor, and the stirring blade of the second polymerization reactor in Example 1 was used in the first polymerization reactor. That is, in this comparative example, the number of tanks in the first polymerization reactor was 1.1 in the perfect mixing cell model in the series connection, and the number of tanks in the second polymerization reactor was 2.0 in the perfect mixing cell model in series connection. As a result of carrying out the polymerization as in Example 1, an ethylene-propylene-5-ethylidene-2-norbornene copolymer was obtained. The ethylene-propylene-5-ethylidene-2-norbornene copolymer had a Mooney viscosity of 62, an amount of propylene unit/(amount of ethylene unit+amount of propylene unit) of 30.8% by weight, an iodine value of 18, a breaking elongation of 2650%, and a breaking strength of 1.18 MPa.

Example 2

Polymerization

Ethylene, propylene and 5-ethylidene-2-norbornene were continuously copolymerized using a polymerization reaction apparatus comprising two 100 L polymerization reactors made of SUS which were connected in series. In the first polymerization reactor, two tilted paddle blades were provided at the upper and lower stages, and the rotation direction was set so that a downward flow of liquid was produced by the tilted paddle blades. The stirring blades shown in FIG. 1 were provided in the second polymerization reactor. Hexane as a polymerization solvent was continuously fed at a rate of 87.4 kg/hr, ethylene, propylene and 5-ethylidene-2-norbornene as monomers were continuously fed at a rate of 5.05 kg/hr, 21.20 kg/hr and 0.63 kg/hr, respectively, and oxytriisopropoxyvanadium and ethylaluminumsesquichloride as catalysts were continuously fed at a rate of 0.00415 kg/hr and 0.0237 kg/hr, respectively, into the first polymerization reactor from the bottom thereof. On the other hand, from the top of the first polymerization reactor was continuously drawn the reaction mixture so that the amount of the reaction mixture in the first polymerization reactor was 100 L. Regulation of molecular weight was carried out with hydrogen. The feeding rate of hydrogen was 15 NL/hr. While the reaction mixture drawn from the top of the first polymerization reactor was fed into the second polymerization reactor from the bottom thereof, hexane as a polymerization solvent was continuously fed at a rate of 33.1 kg/hr, ethylene and 5-ethylidene-2-norbornene as monomers were continuously fed at a rate of 1.29 kg/hr and 0.216 kg/hr, respectively, and oxytriisopropoxyvanadium and ethylaluminumsesquichloride as catalysts were continuously fed at a rate of 0.0247 kg/hr and 0.0141 kg/hr, respectively, into the second polymerization reactor from the bottom thereof. The reaction mixture was continuously drawn from the top of the second polymerization reactor so that the amount of the reaction mixture in the second polymerization reactor was 100 L. The temperatures of both the first polymerization reactor and the second polymerization reactor were controlled to 50° C.

A small amount of polypropylene glycol was added to the reaction mixture drawn from the second polymerization reactor to terminate the polymerization reaction. After removing the monomers and washing with water, the solvent was removed with steam in a large amount of water, followed by drying at 80° C. under reduced pressure to obtain ethylene-propylene-5-ethylidene-2-norbornene copolymer.

(Physical Properties of Polymer)

The resulting ethylene-propylene-5-ethylidene-2-norbornene copolymer had a Mooney viscosity of 61, an amount of propylene unit/(amount of ethylene unit+amount of propylene unit) of 28.3% by weight, an iodine value of 16, a breaking elongation of 2100%, and a breaking strength of 3.32 MPa.

(Measurement of the Number of Tanks in the Perfect Mixing Cell Model)

To the hexane line which was supplied to the first tank in the polymerization system of Example 2, dodecane was introduced in a step function manner at 50 g/hour, and the polymerization mixture was taken from the outlet of the first tank at the points of time of 0, 5, 10, 15, 20, 25, 30, 40, 60, 100 and 120 minutes after the introduction of dodecane (0 minute). The concentration of dodecane in the polymerization mixture taken above was measured by a gas chromatograph mass spectrometer to measure retention time distribution of dodecane. Also as to the second tank, the same operation was conducted to measure retention time distribution. To the thus obtained retention time distribution, retention time distribution function in the tank model was fitted to calculate the number of tanks in the perfect mixing cell model in the first polymerization reactor and in the second polymerization reactor. The number of tanks in the first polymerization reactor was 1.6 and the number of tanks in the second polymerization reactor was 1.2.

Comparative Example 2

Polymerization

Polymerization was effected in the same manner as in Example 2 except that the rotation direction was set so that an upward flow of liquid was produced by the tilted paddle blades (namely, the liquid was paddled up) provided in the first polymerization reactor.

(Physical Properties of Polymer)

The resulting ethylene-propylene-5-ethylidene-2-norbornene copolymer had a Mooney viscosity of 64, an amount of propylene unit/(amount of ethylene unit+amount of propylene unit) of 29.9% by weight, an iodine value of 16, a breaking elongation of 2200%, and a breaking strength of 1.75 MPa.

(Measurement of the Number of Tanks in the Perfect Mixing Cell Model)

The number of tanks in the perfect mixing cell model in the first polymerization reactor and in the second polymerization reactor was calculated in the same manner as in Example 2. The number of tanks in the first polymerization reactor was 1.3 and the number of tanks in the second polymerization reactor was 1.5.

The invention claimed is:

1. A process for producing an ethylene-α-olefin copolymer which comprises continuously polymerizing ethylene and α-olefin in a solvent in the presence of an olefin polymerization catalyst using a polymerization reaction apparatus comprising two or more tanks of polymerization reactors connected in series, said process including the following first polymerization step and second polymerization step:

the first polymerization step of producing in a first tank of the polymerization reactor a polymer component having a Mooney viscosity at 100° C. of 10-300 and containing 45-80% by weight of a monomer unit based on ethylene (with a proviso that total content of the monomer unit based on ethylene and the monomer unit based on α-olefin is assumed to be 100% by weight) under the polymerization conditions of a polymerization temperature of −20-200° C., a polymerization pressure of 0.1-10 MPa, and a flow state being 1.5 or more tanks in the perfect mixing cell model, and the second polymerization step of producing in a second tank of the polymerization reactor a polymer component having a Mooney viscosity at 100° C. of 10-300 and containing 45-80% by weight of a monomer unit based on ethylene (with a proviso that total content of the monomer unit based on ethylene and the monomer unit based on α-olefin is assumed to be 100% by weight) under the polymerization conditions of a polymerization temperature of −20-200° C., a polymerization pressure of 0.1-10 MPa, a flow state being less than 1.5 tank in the perfect mixing cell model, and a ratio (n1/n2) of 1.5 or more in which n1 denotes the number of tanks in the perfect mixing cell model at the first polymerization step and n2 denotes the number of tanks in the perfect mixing cell model at the second polymerization step, wherein a reaction mixture obtained by polymerization in the polymerization reactor at the first polymerization step is continuously fed to the polymerization reactor of the second polymerization step.

* * * * *